Dec. 20, 1955 J. P. VAN DUYNE 2,728,052

ADJUSTABLE BAND PASS FILTER

Filed July 1, 1950

INVENTOR.
JOHN P. VAN DUYNE
BY
Darby & Darby
ATTORNEYS 2,728,052

ADJUSTABLE BAND PASS FILTER

John P. Van Duyne, Denville, N. J., assignor to Allen B. Du Mont Laboratories, Inc., Clifton, N. J., a corporation of Delaware Application July 1, 1950, Serial No. 171,700

7 Claims. (Cl. 333—78)

This invention relates to selective circuits of the band pass variety such as are used in intermediate frequency amplifiers of television receivers and the like.

Television receivers utilize double tuned coupled circuits to obtain proper band width and selectivity properties. In order that the band width of the receiver be the proper value, it is necessary that the coupling of the several intermediate frequency double tuned circuits be controllable within specified limits. In the past the provision for adjustment of coupling has required either the employment of expensive close tolerance components or the provision of a coupling adjustment. If coupling is made adjustable, it is desirable that the element be stable over a period of time against changes in weather, mechanical shock, and vibration, and that it be made readily accessible.

It is, accordingly, an object of this invention to provide a band pass filter in which coupling is readily adjustable, and in which all elements are rugged, stable against changes in weather, mechanical shock, and vibration, which filter is inexpensive to manufacture, and lends itself to assembly in mass produced articles such as television receivers.

It is a second object of my invention to provide a filter in which the critical elements are adjustable to a stable condition so that a completed unit can be packaged and shipped to a remote assembly location and there be equivalent to a non-adjustable assembly employing close tolerance components.

It is a third object to provide a structure which incorporates the first and second objects in identical structures, to obtain the cost benefits of mass production and a single inventory item.

Other objects and advantages of the invention will in part be obvious and in part appear hereinafter.

The invention is embodied in a single unitary circuit component in which advantage is taken of axial alignment of elements on a core to provide for series connection of a pair of variable condensers with parallel connection to appropriate slug tuned inductance coils for tuning therewith.

Figure 1:
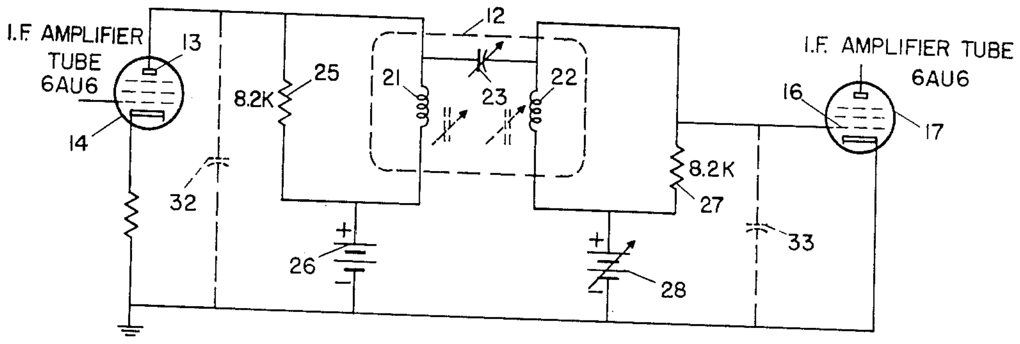
Figure 1 is a diagram of a circuit in a television receiver incorporating the invention.

In Figure 1, a filter 12 embodying my invention is connected between an output electrode 13 of a first intermediate amplifier tube 14 and an input electrode 16 of a subsequent amplifier tube 17. The filter 12 comprises a primary inductance 21, a secondary inductance 22, and a coupling capacitor 23, these elements being independently adjustable and of a structure to be described more completely with reference to the other figures. The primary inductance 21 is connected in parallel with a primary damping resistor 25 and in series with a source 26 of positive voltage, which source is preferably the usual "B" supply of the receiver.

The first amplifier tube 14 might alternatively be a multi-electrode heterodyne mixer or converter tube.

The secondary inductance 22 is connected in parallel with a secondary damping resistance 27 and in series with a variable source of bias 28 which may be an automatic gain control circuit. The primary inductance 21 resonates at intermediate frequency with capacitance-to-ground of the output electrode 13 and other circuit elements, these being indicated in broken lines as a capacitance 32. Similarly, the secondary inductance 22 resonates with capacitance to ground indicated by broken lines as a capacitance 33.

Figure 2:
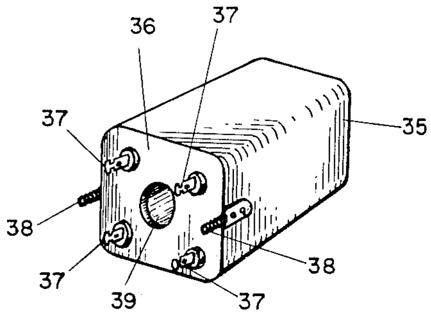
Figure 2 is a perspective view of a filter incorporating my invention.

Referring to Figure 2, the structure of the filter 12 comprises an external conductive shield 35 substantially enclosing the filter elements, an insulator base 36, connecting lugs 37, mounting feet 38, and a bottom alignment hole 39 in the base 36. A corresponding alignment hole not visible in the drawing is located at the opposite end of the filter from the hole 39.

Figure 3:
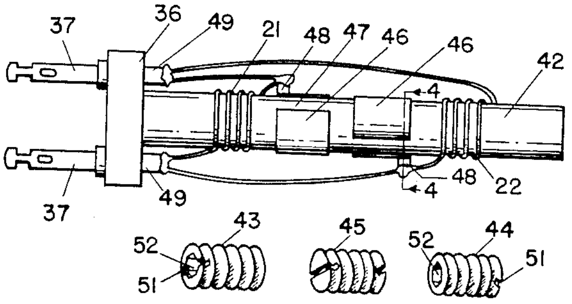
Figure 3 shows details of my invention, positioned in accordance with their position within the filter.
Figure 4:
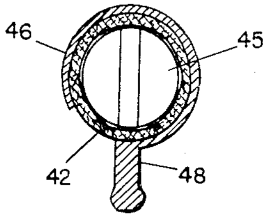
Figure 4 is a section across the coil in Figure 3 taken at line 4—4.

In Figure 3, where the filter is shown with its shield 35 removed, a hollow cylindrical dielectric coil form 42 is attached rigidly to the insulator base 36. The coil form 42 is essentially circular in cross section, but slightly deformed in a triangular pattern and threaded internally. Cylindrical externally threaded magnetic slugs 43 and 44 and a conductive slug 45 are located within the coil form 42 in longitudinal positions approximately as indicated in this figure, the external threads of the slugs engaging the internal threads of the coil form, and the triangular deformation of the latter insuring that the slugs are gripped firmly on three sides to resist any changes from vibration or weather, and yet not binding to prevent adjustment when desired.

The primary inductance 21 and secondary inductance 22 are wound externally and rigidly adhered to coil form 42. The capacitor 23 comprises a pair of C-shaped conductive members or bands 46 fastened rigidly to the central portion of said coil form 42 between the inductances 21 and 22, each band being provided with a longitudinally extending slot 47 and a connecting tab 48 and cooperating with the adjustable conductive slug 45. The ends of the inductances 21 and 22 are connected and soldered to internal terminals 49 of the connecting lugs 37, one of these ends of each coil being also connected and soldered to each of the tabs 48 respectively.

The conductive slug 45 is preferably formed of brass and is slotted at each end to permit adjustment from either end by a screw driver. The magnetic slugs 43, 44 are composed preferably of permeable material such as powdered iron, or alternatively of magnetically repellent conductive material such as brass, and are molded with a slot 51 at one end and a longitudinally extending hexagonally shaped hole 52. The magnetic slugs 42, 43 can be adjusted each from its own end by means of a screw driver engaging the slot 51, or by means of an Allen head wrench engaging the hexagonal hole 52. The conductive slug 45 can be adjusted from either end by extending a screw driver or alignment tool through the hexagonal hole 52 of the magnetic slugs 43, 44 to engage the slot in the conductive slug 45.

In operation, the inductances 21 and 22 are adjusted by turning the magnetic slugs 43, 44 respectively associated therewith. The capacitor 23 is equivalent to two component capacitances in series, each component capacitance comprising one of the conductive sleeves 46 and the conductive slug 45 with the coil form between as a dielectric. When the conductive slug 45 is exactly centered, the capacitor 23 has its maximum value, representing maximum coupling between the primary and secondary tuned circuits. When the slug 45 is not centered, one of the component capacitances is less and one is more than when centered, so that the series capacitance of the two is less than the maximum, representing a lower value of coupling between the primary and secondary tuned circuits.

The longitudinal slot 47 prevents the bands 46 from extending conductively completely around the coil form 42, which bands if complete would act like a short circuited turn, lowering the figure of merit or Q of the inductances. The conductive slug 45, being more remotely located with respect to the inductances, has negligible effect upon them. The preferred length of the conductive slug 45 is a little more than that of the conductive bands 46 but less than twice their length. The preferred separation between the bands 46 is less than their length. The longitudinal dimensions of the bands 46, although here shown to be identical to one another, need not be.

A convenient alignment tool for use with this filter is double ended; one end comprising a screw driver top shaped to extend through the hexagonal hole 52 of the magnetic slugs and to engage the slotted end of the conductive slug 45; the other end comprising a hexagonal shaft shaped to engage the hexagonal hole 52.

A particular advantage of the invention is the mounting on a single form 42 of all the essential electrical parts of the filter. The coils 21, 22, the slugs 43, 44, 45 and the bands 46, all either adhere rigidly to the form, or else are threaded to it internally, engaging it firmly on three sides. This permits the adjustment of all three elements and absolute stability thereafter, permitting shipment from a prealignment plant to an assembly plant, if desired. It also makes the filter stable against vibration, shock, temperature changes, humidity changes, microphonics, and so forth.

Although a specific embodiment of my invention has been shown and described, its scope is in accordance with the following claims.

What is claimed is:

1. A transformer comprising a cylindrical dielectric form threaded internally, a pair of conductive coils wound about the outer surface of said form forming primary and secondary coils respectively of said transformer, a capacitance comprising a pair of conductive bands on said form said bands being connected respectively to said coils and forming capacitive coupling therebetween, a pair of cylindrical magnetic tuning slugs located within said coil form within the electric field respectively of each of said coils, said magnetic slugs being threaded externally and in engagement with said form and having axially located openings longitudinally their entire lengths, and a conductive slug located within said coil form in the electric field of said capacitance, said conductive slug being threaded externally and in engagement with said coil form and having an end thereof slotted for engagement with an alignment tool.

2. A transformer comprising a cylindrical dielectric coil form having threads internally thereof, a pair of conductive coils on said form, a coupling capacitance comprising a pair of conductive bands connected respectively to said coils and mounted on said form, magnetic tuning slugs located within said form in the electric fields of said coils respectively, said magnetic slugs being threaded externally in engagement with said form, and a conductive slug located within said form within the electric field of said capacitance and threaded externally in engagement with said form, one of said slugs having a longitudinal opening therethrough.

3. The transformer structure of claim 2 in which each magnetic slug has an axial hexagonal opening extending longitudinally therethrough.

4. The transformer structure of claim 2 in which said conductive bands are located between said coils on said form.

5. An electrical transformer comprising a pair of coils forming a primary and secondary therefor and positioned on a common axis, a pair of tuning slugs movably positioned on said axis respectively in the electric fields of each of said coils, a coupling capacitance comprising a pair of conductive bands connected respectively to said coils and curved about said axis, and a conductive slug movably positioned on said axis in the electric field of said capacitance, one of said slugs having a longitudinal opening therethrough to permit access to another of said slugs for tuning purposes.

6. The structure of claim 5 in which said bands are positioned between said coils.

7. The structure of claim 6 in which each said tuning slug has a tuning tool receptacle and an axial opening therethrough and said conductive slug has a tuning tool receptacle.

References Cited in the file of this patent

UNITED STATES PATENTS

| | | |
|---|---|---|
| 1,641,438 | Jones | Sept. 6, 1927 |
| 2,147,425 | Bock | Feb. 14, 1939 |
| 2,204,086 | Kamenarovic | June 11, 1940 |
| 2,346,584 | Jacob | Apr. 11, 1944 |
| 2,403,349 | Dolberg | July 2, 1946 |
| 2,435,630 | Ketcham | Feb. 10, 1948 |
| 2,464,377 | Cohen | Mar. 15, 1949 |
| 2,519,009 | Wolfe | Aug. 15, 1950 |
| 2,564,740 | Toth | Aug. 21, 1951 |

FOREIGN PATENTS

| | | |
|---|---|---|
| 541,712 | Great Britain | Dec. 8, 1941 |

OTHER REFERENCES

Serial No. 342,615, Bergtold (A. P. C.), published May 25, 1943.